June 25, 1957

R. L. DUNKELMAN 2,796,679

AUTOMATIC CLOTHES DRYER CONTROL

Filed July 13, 1954

2 Sheets-Sheet 2

INVENTOR.
ROBERT L. DUNKELMAN
BY
HIS ATTORNEY

United States Patent Office

2,796,679
Patented June 25, 1957

2,796,679

AUTOMATIC CLOTHES DRYER CONTROL

Robert L. Dunkelman, Louisville, Ky., assignor to General Electric Company, a corporation of New York Application July 13, 1954, Serial No. 443,101

3 Claims. (Cl. 34—45)

This invention relates to laundry appliances such as clothes dryers, and more particularly to an automatic control for such apparatus.

An object of this invention is to provide a simplified sequence control for a clothes dryer or the like having automatic means for sensing the size of the drying load to influence the total time of machine operation.

A further object of my invention is to provide an automatic electrical control for a clothes dryer having a single manually adjustable control knob to preselect the extent of drying desired, with automatic compensation of drying time dependent upon the clothes drying load. It is also an object in connection with this automatic control system to provide a machine maintaining a safe peak operating temperature for all types of fabrics.

Still another object of this invention is to provide a clothes dryer control utilizing time as the adjustable control variable, and which employs temperature within the machine to vary the total operating time dependent upon clothes load.

A still further object of this invention is to provide an automatic control for a device having a heater and drive means, for example the tumbling drive means of a dryer, arranged to continue both the heater and drive means in operation up to a desired operating temperature, and thereafter for an additional pre-selected and timed period. It is also an object of this automatic control to provide a cool-down period by terminating heater operation prior to operation of the drive means.

Briefly stated, in accordance with one aspect of my invention, control circuits are provided for both the heater and the clothes dryer drive means, with sequence control switches for the respective circuits. The switches control the circuits to terminate heater operation shortly before final machine shut-down at the end of a cycle. The control drive for operating the sequence switches is advanced by electrical operating means rendered effective when a main temperature sensing device functions to cycle the circuit to the main heating element for maintaining operating temperature within the machine. For example, each time the main heater is cycled from on to off, the control drive is rendered effective to advance the position of the sequence control. Provision is also made whereby the sequence control opens the circuits to all operating components of the electrical control system at the conclusion of the drying operation.

Figure 1:
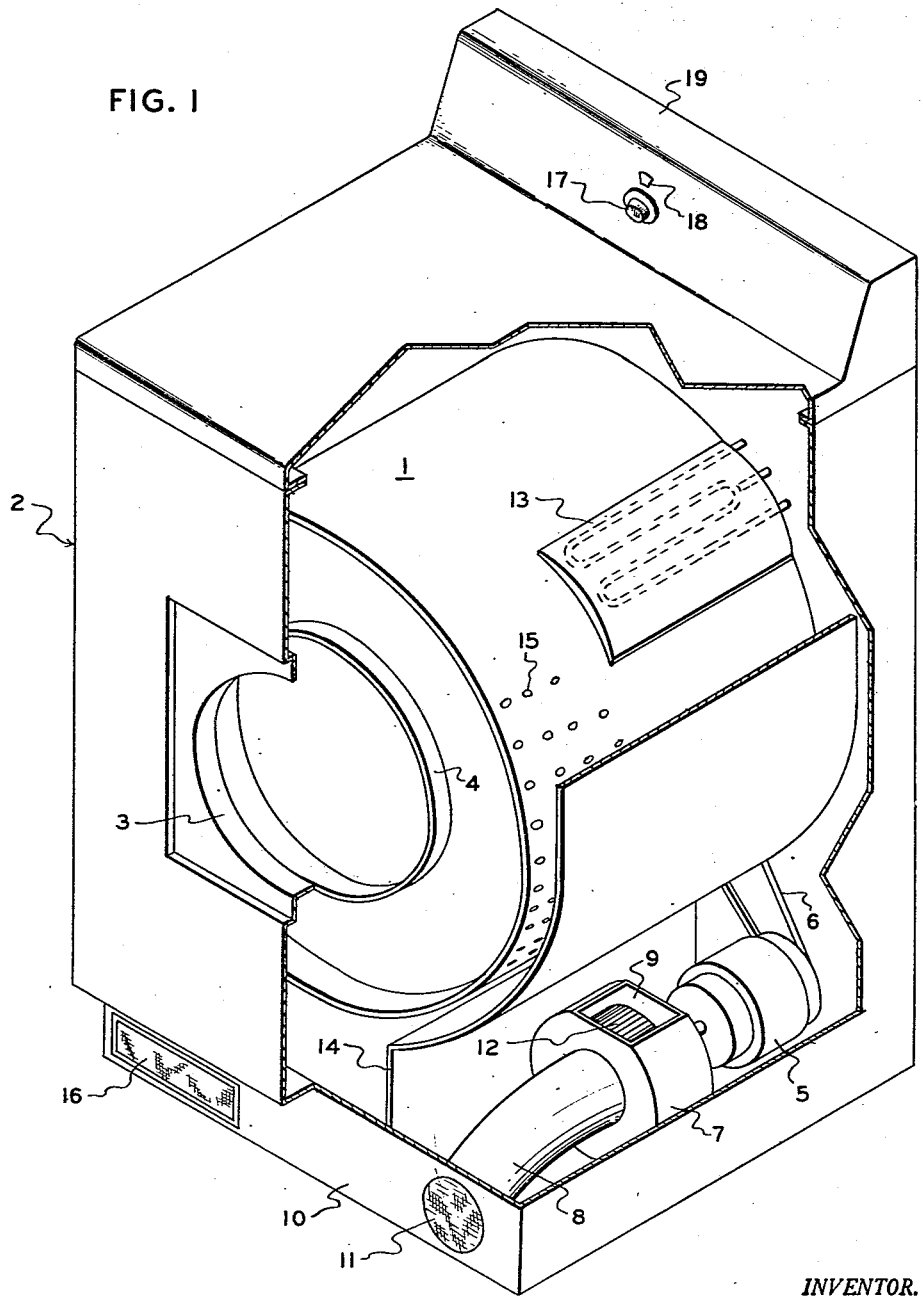
Figure 2:
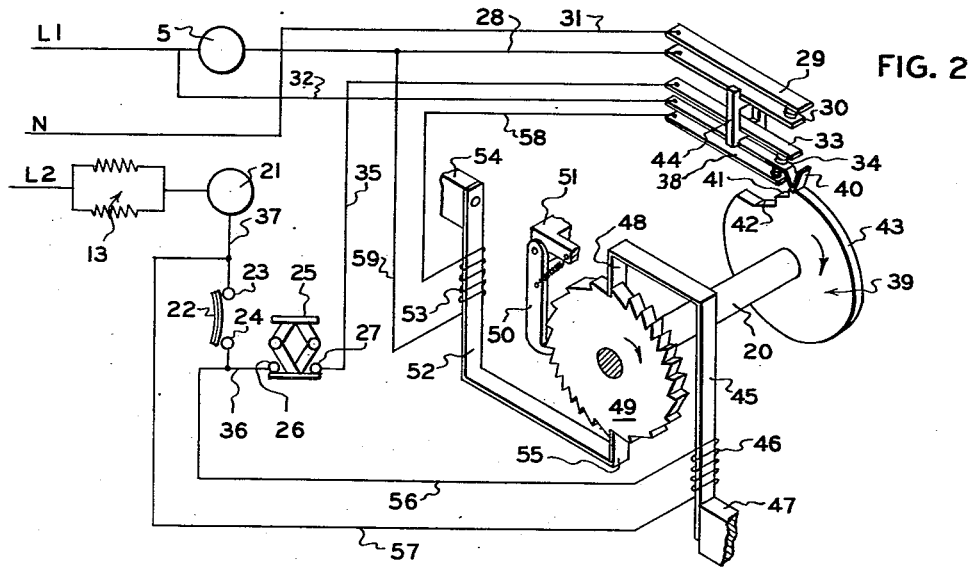
Figure 3:
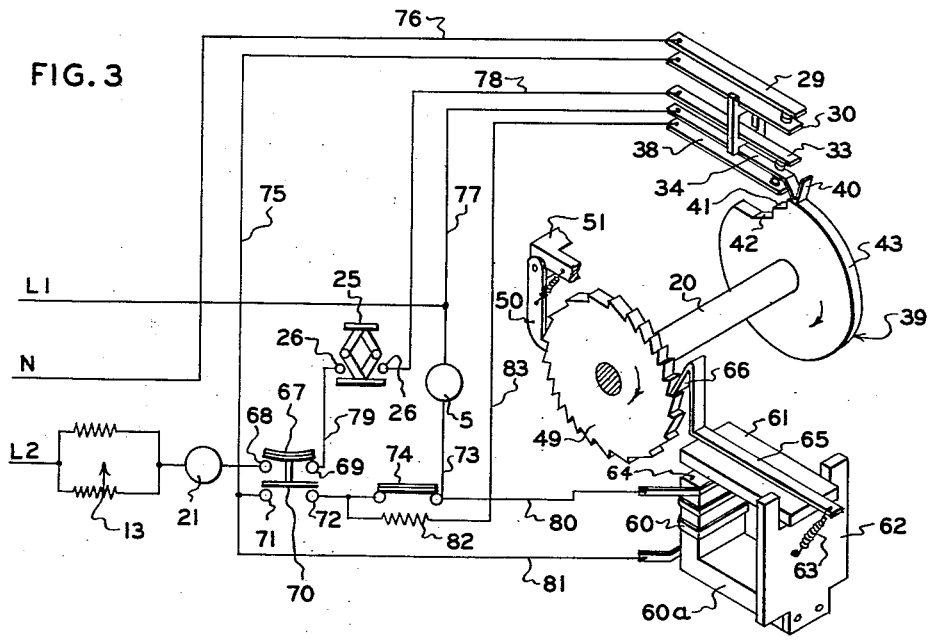

The features of my invention which I believe to be novel are set forth with particularity in the appended claims. My invention itself, both as to its organization and method of operation, together with further objects and advantages thereof, may best be understood by reference to the following description taken in connection with the accompanying drawings, in which Fig. 1 is a perspective view of a clothes dryer, with sections thereof broken away to illustrate detail, illustrating a typical application for this invention; Fig. 2 is a schematic illustration of the automatic electrical control system of one form of my invention; and Fig. 3 is a schematic view of a modified form of the electrical control system.

Referring now to the drawings, in Fig. 1 I have shown a clothes dryer of the domestic type, for which my invention is particularly useful, although not necessarily so limited. In accordance with conventional practice, the clothes dryer includes a rotatable drum or basket 1 mounted within an outer enclosing cabinet structure 2, the front wall of which is provided with a loading opening 3 in axial alignment with a similar loading opening 4 in the front wall of the rotatable basket. The cabinet structure also encloses a suitable basket drive means, here shown as an electric motor 5, having for example a belt drive 6, whereby basket 1 may be rotated at a suitable speed for tumbling articles of clothing placed therein. Motor 5 may also provide a drive to a suitable fan or air blower 7 shown in the drawing as being of the centrifugal blower type with an axial air inlet 8 and peripheral outlet 9. The inlet conduit 8 extends forwardly to the toeboard 10, which is provided with a screened air inlet aperture 11. In the usual manner, upon rotation of the fan impeller 12 by motor 5, air is drawn in through aperture 11 and inlet tube 8 and forced outwardly from fan discharge 9. The discharged air is directed upwardly and over a heating element assembly 13 by an interior baffle member 14 extending upwardly from the base of the machine and thence arcuately following the shape of basket 1 to a point in the general vicinity of the electrical heating element. The air is then directed over the electrical heating element and downwardly through the foraminated cylindrical wall 15 of the rotating basket. Under pressure from the blower, the heated air moves downwardly through the basket and the articles of clothing being tumbled therein, extracting moisture, and finally venting to the outside of the cabinet through an appropriate lint trap structure (not shown) to discharge opening 16 in the toeboard. The construction thus far described is of a more or less conventional arrangement of a domestic clothes dryer.

In the domestic appliance field, a clothes dryer must be universally adaptable to small loads consisting of only one or two articles to large loads of 8 to 10 pounds of dry clothes representing capacity of a typical machine. In addition, the machine must be capable of safely drying all types of fabrics from the delicate synthetics to the more rugged cottons and linens. In all cases, it is highly desirable that the dryer perform its operation in the minimum of time, and with the minimum consumption of heat energy. These requirements, in past constructions, have led to the use of separate temperature and time controls, and it is left to the discretion of the operator to select the proper operating temperature and drying time. In practice it has been found that it is very difficult for most users of domestic clothes dryers properly to estimate these two varible factors, and hence it often occurs that the clothes are either overdried, or are not dried sufficiently.

In accordance with the present invention, an automatic control is provided under the control of a single adjustable control knob 17 which has associated with it an indicator window 18 showing the machine setting. It is contemplated that this indicator will be calibrated, not in temperature degrees or in time, but with suitable indicia to indicate generally the type load and degree of dryness desired. Operator selection is thus greatly facilitated.

In Fig. 2 is shown schematically the automatic electrical control system for operating the heating element assembly 13 and the driving motor 5 in properly timed sequence to perform the desired drying operation, all in accordance with this invention. It is to be understood that this electrical control system may be mounted in an appropriate fashion within the cabinet structure, certain operating components being included immediately behind back-splasher panel 19. More specifically, the shaft 20, as shown in Fig. 2, is a continuation of the shaft rotated by the external control knob 17. A safety thermostat 21 and a main cycling thermostat, including a bimetallic element 22, are mounted at an appropriate point within the dryer enclosure to sense interior operating temperature. As shown by Fig. 2, thermostat 22 is arranged to bridge a pair of contacts 23 and 24 for dryer control as will be presently described. A centrifugally operated mechanism 25, included appropriately within motor 5, is arranged to bridge a pair of contacts 26 and 27 when the motor is operating at normal speed. The remaining components of this electrical control system are mounted in the upper portion of the cabinet, for example behind backsplasher panel 19 as previously indicated.

It is desirable for satisfactory dryer operation to energize the main drive motor and the heating element throughout the desired drying period, with termination of heater operation followed in approximately 5 minutes by termination of drive motor operation. This 5 minute period at the end of the cycle, during which only the main drive motor is in operation, provides a cool-down for the machine so that the contents thereof can be removed safely and comfortably without danger of burning by contact with metallic parts. Correspondingly, independent control is provided for the main drive motor 5 and the heating element 13. As shown in Fig. 2, the electrical power is supplied from lines L1 and L2 with an electrical neutral connection N. The electrical circuit for motor 5 commences with L1, includes line 28, a pair of cooperating contact members 29 and 30, and line 31 to the electrical neutral. Assuming that lines L1 and L2 comprise domestic 220 volt electrical supply lines, a voltage of approximately 110 volts is supplied from line L1 to neutral for operating motor 5. As clearly shown, upon closure of the circuit through contact strips 29 and 30, motor 5 is energized for operation.

The electrical heating element is energized across the 220 volt line with a circuit commencing with L1, through conductor 32, to a switch made up of contact strips 33 and 34 of the sequence control. When the circuit is closed through contact members 33 and 34, the circuit continues through a conductor 35 to centrifugal switch contact 27. If the motor is operating, the circuit continues through the centrifugal switch, contact 26, to a line 36 connected to terminal 24 of the main cycling thermostat 22. At room temperature this thermostat is closed and does not open the circuit through contacts 23 and 24 until a predetermined maximum operating temperature occurs within the dryer. When this thermostatic switch is closed, the circuit continues to a conductor 37, the safety thermostat 21, and to the heating element assembly 13, which in turn has its opposite terminal connected to line L2. The safety thermostat is of a conventional type including normally closed contacts which remain closed unless an abnormally high temperature occurs within the dryer. It is thus seen that heater operation is dependent upon closure of the sequence switch at contact members 33 and 34, the centrifugal motor switch 25, the main cycling thermostat 22, and the safety thermostat 21.

The sequence switch assembly includes an additional contact switch blade 38 for a purpose to be described presently. This bank of switches is operated in the desired sequence by a cam 39 cooperating with a cam follower 40 projecting outwardly from switch arm 34 as shown. Cam 39 includes a first step 41, a second step 42 having a shorter radius with respect to the axis of shaft 20, and of course, an outer peripheral surface 43 of a uniform radius. In the position shown in Fig. 2, cam follower 40 is riding the peripheral surface 43 of maximum radius, and hence arm 34 has been raised into contact with switch arm 33, thereby completing the circuit to the electrical heating element; and by means of a non-conductive operating yoke 44, contact arm 30 has been moved into a circuit making position with respect to contact arm 29. Therefore, a circuit is also completed to drive motor 5. When cam 39 is rotated in the direction of the arrow, cam follower 40 drops to the first step 41, opening the circuit between switch arms 33 and 34, closing the circuit between switch arms 34 and 38, while switch arms 29 and 30 remain in the closed position. This continues the motor in operation but terminates heater operation. As rotation of cam 39 continues, cam follower 40 drops into the lowest recess 42 to open the circuit through contact strips 29 and 30, thus terminating motor operation and completing the operational cycle. Whenever it is desired to resume operation, cam 39 is rotated manually by means of control knob 17 (Fig. 1) to raise cam follower 40 from recess 42 to the outer surface 43, thereby closing both circuits through strips 29 and 30 for the motor and 33 and 34 for the heater.

In view of the foregoing description, it is clear that the sequence of dryer operations can be controlled and timed by controlling the rotation of cam 39 in the direction of the arrow. In accordance with the embodiment of Fig. 2, this may be accomplished by means of a stepping device shown as comprising a bimetallic strip 45 and associated electrical heater 46 encircling the bimetallic strip. The bimetallic element 45 is, of course, mounted to an appropriate support 47 and includes on its outer end a detent 48 cooperating with a ratchet wheel 49. Reverse rotation of the ratchet wheel may be prevented in a conventional manner by employing a pawl 50 pivotally mounted to a support at 51 and spring biased into engagement with the ratchet wheel. With this arrangement, when electrical heating element 46 is energized, heat is immediately imparted to bimetallic strip 45, whereby it deflects in a direction to rotate ratchet wheel 49 in the direction of the arrow.

Ratchet wheel 49 may also be rotated in the Fig. 2 embodiment by a second bimetallic strip 52 heated by an encircling heating element 53. The bimetallic strip 52 is, of course, mounted to an appropriate support as at 54, and the dissimilar metals making up the strip are so selected that when the strip is heated it causes rotation of the ratchet wheel in the direction of the arrow by means of a detent 55 formed on the end thereof.

Operation of the heater 46 associated with bimetal 45 is controlled by the main cycling thermostat 22. When the main cycling thermostat 22 is in the closed position completing the circuit through contacts 23 and 24, the main heating element 13 may be in operation and the control heater 46 is inoperative. However, when cycling thermostat 22 moves to its open position, a circuit may be completed to the control heater 46, commencing with line L1, through conductor 32, contact strip 34, contact strip 33, conductor 35, the centrifugal switch, conductor 36, a conductor 56, the control heater 46, a conductor 57 and through the safety thermostat and main heater to line L2. Thus it is seen, that when the main cycling thermostat 22 is open, control heater 46 is energized in series with the main heater 13. However, since the resistance of the main heater assembly is in the neighborhood of 10 or 11 ohms for machines currently in use for domestic purposes, and the resistance of the control heater is in the neighborhood of 1,000 ohms or more, the main heater is dissipating relatively little energy, while a control wattage is dissipated by heater 46 to heat the bimetallic element 45 and drive ratchet wheel 49 one or more steps in a clockwise direction as shown. When the main cycling thermostat again recloses, control heater 46 is short-circuited, allowing the thermostatic element 45 to cool and reset to its original position. This sequence of operations continues, with the ratchet wheel being driven one or more steps each time the main cycling thermostat 22 opens the circuit to the main heater, until cam 39 is eventually driven to the off position.

At this point it should be noted that when the step-by-step drive has rotated cam 39 to the point where cam follower 40 drops onto the first step 41, the main heating element is de-energized by the opening of the circuit through switch arms 33 and 34. Hence the machine commences to cool down, and the cycling thermostat 22 closes; but there is no further power supply to control heating element 46. It is seen therefore that with contact members 33 and 34 open, there is no longer an available drive through the control heating element 46 to rotate cam 39 the additional step where follower 40 falls into recess 42 to terminate machine operation. It is for this reason that the additional control heater 53 and thermostatic element 52 are employed. As shown by Fig. 2, the circuit to control heater 53 is completed from line L1, through conductor 32, contact strip 34, contact strip 38, a conductor 58, control heater 53, a conductor 59, contact strip 30, contact strip 29, and conductor 31 to the electrical neutral. It will be recalled that the circuit was completed between contact strips 34 and 38 at the moment that cam follower 40 dropped to the first recessed step 41 to commence the cool-down period. Heater 53 is therefore energized causing the bimetallic strip 52 through detent 55 to rotate the ratchet wheel 49 the additional step causing the follower 40 to drop into recess 42. As previously explained, this results in opening of the circuit through contact strips 29 and 30, thereby terminating machine operation.

To review briefly the operation of the Fig. 2 embodiment of this invention, the clothes to be dried are, of course, first inserted into the tumbling basket. Thereupon, the operator rotates the control knob 17 selecting the desired position based upon the type of clothes load and the degree of dryness desired. This rotation of the control knob results in a corresponding rotation of ratchet wheel 49 and cam 39, all of which are secured together on common shaft 20. Rotation is permitted only in a clockwise direction as shown by the arrow in Fig. 2 by means of the spring loaded pawl 50. This initial setting of the control knob has rotated cam 39 to a position wherein cam follower 40 is riding on the exterior cam surface 43, in which position the circuit between contact strips 38 and 34 is open, while the heating element switch contacts 33 and 34 are closed as well as the circuit to the main drive motor through contact arms 29 and 30. As soon as the main drive motor comes up to its normal operating speed, the centrifugal switch is operated to its closed position to complete the circuit to the main heating element assembly 13. The machine is now in full operation to dry the clothes, but it should be noted that the timing means, including ratchet wheel 49 and the bimetallic strips 45 and 52, is inoperative and cam 39 remains stationary. This situation prevails until such time as the desired peak operating temperature occurs within the machine. This peak operating temperature may be selected, by proper selection or adjustment of thermostatic element 22, to provide a safe temperature for all items that may be inserted within the machine. The feature of this construction that is particularly desirable is that regardless of clothes load, original temperature within the machine or other variable factors, the dryer timer does not commence operation until peak operating temperature has been achieved.

As soon as operating temperature is reached, the main cycling thermostat 22 opens the circuit to the main heating element, simultaneously resulting in application of power to control heater 46 for the timer drive. The timer drive therefore is effective only during those periods when the main heating element is off. Thus, as the cycling thermostat energizes and de-energizes the main heating element to maintain the desired average operating temperature within the machine, the timer is driven with a step-by-step motion until the point is reached upon rotation of cam 39 at which cam follower 40 drops into the first cam recess 41 to terminate operation of the main heater and commence the final cool-down period. At this time, the second control heater 53 becomes effective to advance the control the additional step necessary to permit cam follower 40 to drop into recess 42, and thereby terminate machine operation.

It is to be understood that the wattage of control heater 53 is selected to provide a cool-down period of an appropriate length. It is found in practice in domestic clothes dryers of a type currently being marketed, that a cool-down period in the neighborhood of five minutes is sufficient to permit comfortable handling of the articles which have been dried. While I have shown this auxiliary control heater 53 associated with a separate bimetallic strip, obviously, heater 53 might also be incorporated on the thermostatic strip 45, with the wattage input and the thermal mass so selected that a proper time delay is achieved.

In the alternate embodiment of Fig. 3, I have disclosed an arrangement employing an electro-magnetic stepping relay in contrast to the thermal relay means of Fig. 2 for stepping the ratchet wheel 49 to time the drying period. Since many of the components are identical in both Figs. 2 and 3 I have employed the same reference characters to designate identical parts.

As shown by Fig. 3, the motive power for rotating the ratchet wheel 49 with a step-by-step motion is provided by an electromagnet consisting of a low impedance or series type coil 60 wound on a core 60a and having an armature 61 pivotally mounted on a support plate 62, with resilient means 63 to bias armature 61 to a position displaced from the pole 64 of the electro-magnet. Secured to armature 61 in any suitable manner is a ratchet wheel actuating detent 65 having a hooked portion 66 on its outer end for cooperation with the teeth of the ratchet wheel. Thus, as clearly illustrated by Fig. 3, when the coil 60 is energized, armature 61 moves downwardly against pole face 64, thereby moving the ratchet wheel through one or more steps. When the coil is de-energized, spring 63 raises the armature and also the detent member preparatory to the next actuation. Thus, as power is supplied to and removed from coil 60, ratchet wheel 49 is driven with a step-by-step motion in a clockwise direction as shown.

As with the previous described embodiment, energization of the stepping coil 60 occurs when the main cycling thermostat opens the circuit to the main electrical heater 13. In this embodiment, however, the main cycling thermostat, shown as a bimetallic element 67 opens and closes the electrical heater circuit through contacts 68 and 69, and simultaneously controls a second circuit through a connected switch armature 70 associated with contacts 71 and 72.

As previously described, the machine is commenced in operation by rotating control knob 17 through an arc sufficient to place cam follower 40 on the exterior peripheral surface 43 of cam 39. Cam follower 40 is, therefore, in its uppermost position, opening the circuit between contacts 34 and 38 and closing the circuits through contact arms 33, 34 and 29, 30, respectively. The circuit through contact strips 29 and 30, as previously described completes a circuit to driving motor 5 commencing with line L1, motor 5, a conductor 73, a normally closed thermostatic switch 74 (presently to be described), contacts 71 and 72 of the main cycling thermostat (closed except when the machine has reached peak operating temperature), a conductor 75, switch arms 30 and 29, to a conductor 76 corresponding to the electrical neutral. The heating element is rendered effective by switch blades 33 and 34 through a circuit commencing with L1, a conductor 77, switch blade 34, switch blade 33, a conductor 78, centrifugal switch 25, a conductor 79, the main cycling thermostat 67, safety thermostat 21, and the main electrical heating elements 13, to L2. When the peak operating temperature within the machine is reached as sensed by thermostatic element 67, the circuit to the main heating element is broken by the opening of the circuit through contacts 68 and 69. At the same time, the circuit through contacts 71 and 72 is opened. However, the main driving motor 5 continues to operate through the circuit commencing with line L1, motor 5, conductor 73, a conductor 80, the series current coil 60 of the relay, a conductor 81, conductor 75, switch blades 29 and 30, and conductor 76 to the electrical neutral. Therefore, the motor continues to operate in series circuit relation with the series coil 60 of the stepping device; whereby the current flowing through coil 60 energizes the electro-magnet to move armature 61 downwardly and thus impart rotation to the ratchet wheel and cam. At such time as the machine cools slightly to re-close the main cycling thermostat 67, the circuit is also completed across contacts 71 and 72, thereby short-circuiting the stepping coil 60. Thereupon the armature returns to its upper position preparatory to the next operation. This operation continues, stepping ratchet wheel 49 in a clockwise direction until cam follower 40 drops into notch or recess 41, thereby terminating operation of the main heating element. This commences the cool-down period, during which the main cycling thermostat 67 closes.

During the cool-down period, there is of course no further cyclic opening of the circuit through contacts 71 and 72, and hence the stepping relay coil 60 is not energized. To provide the final step necessary to shut the machine completely down and thereby terminate the cycle, a control heating element 82 is employed associated in thermal relation with bimetallic switch element 74. It is to be recalled that when cam follower 40 rests in notch 41 during the cool-down period, a circuit is completed between switch contact arms 34 and 38, thereby completing a circuit to an auxiliary heating element 82 as follows: line L1, conductor 77, switch contact arms 34 and 38, conductor 83, heating element 82, the closed circuit through contacts 71 and 72, conductor 75, switch arms 29 and 30, and conductor 76 to the electrical neutral. Therefore, closure of the circuit through switch arms 34 and 38 at the beginning of the cool-down period applies electrical power to the control heating element 82, which in approximately 5 minutes causes thermostatic switch 74 to open.

As soon as thermostatic switch 74 opens this circuit, the final impulse is given to the current coil 60 of the stepping device through a circuit commencing with line L1, the drive motor 5, conductor 80, the coil 60 of the stepping device, conductor 81, conductor 75, switch contact arms 29 and 30, conductor 76 to the electrical neutral. This final step imparted to the ratchet wheel 49 rotates the cam 39 whereupon follower 40 drops into the lowermost notch 42, to open the circuit through switch arms 29 and 30, thus terminating completely operation of the machine.

In operation, this alternate embodiment is very similar to the previously described arrangement depicted by Fig. 2. The operator can of course adjust the initial rotary position of cam 39. Thereafter, both the heating element and the drive motor continue to operate to evaporate moisture from the articles of clothing being tumbled within the basket until the peak operating temperature is reached as sensed by the main cycling thermostat 67. The thermostat 67 thereupon opens the circuit to the main heating element, allowing the drive motor to continue operation, and energizing the coil of the stepping device. The timing cam is therefore rotated through a limited arc; and the stepping device resets to its initial position upon reclosure of the circuit to the electrical heating element. As the main heating element continues to cycle between on and off positions to maintain a desired average temperature within the machine, the stepping device functions once on each cycle of the heater to rotate the stepping ratchet wheel and hence the timing cam until the follower 40 drops into the first notch or depression in the cam, to terminate heater operation and commence the final cool-down period for the machine. Subsequently, by means of an auxiliary circuit including the thermostatic switch 74 and heater 82, the final impulse is given to the stepping coil 60 to rotate cam 39 the final arc whereupon follower 40 drops into notch 42.

In connection with both embodiments, it is seen that a single control knob is provided for adjustment by the operator to select effective drying time dependent upon the type of clothes load and the degree of dryness desired. In both cases, the variable warm up period at the beginning of operation is not timed; and furthermore, in accordance with this invention, the actual timing function is a function of the cyclic operation of the main electrical heating element. Also, in both embodiments, a low cost, simplified driving or timing motor is provided for the sequence control, providing at all times a construction permitting advance of the control manually.

While the present invention has been described by reference to particular embodiments thereof, it is to be understood that numerous modifications may be made by those skilled in the art without actually departing from the invention. I therefore, aim in the appended claims to cover all such equivalent variations as come within the true spirit and scope of the invention.

What I claim as new and desire to secure by Letters Patent of the United States is:

1. In an automatic clothes dryer or the like having a main heating element and a drive means, an automatic control comprising a circuit for said drive means including a sequence switch, a second circuit for said heating element including a sequence switch, a cam for operating said sequence switches initially closing both switches for a heat drying period and subsequently opening first said heater switch for a cool-down period and subsequently said drive means for terminating the dryer operation, a ratchet wheel connected to said cam for driving said cam, a thermostatic switch operable between closed and open positions for controlling said heating element to maintain a desired average temperature in said dryer, an electrically energized stepping coil for driving said ratchet wheel to advance said cam in a step-by-step motion, means rendering said stepping coil effective responsive to opening of said thermostatic switch thereby to drive said cam periodically until said heater switch is opened for said cool-down period, a thermostat and a heater for said thermostat, a circuit to said thermostat heater including a switch closed by said cam during said cool-down period, and switch means controlled by said thermostat for energizing said stepping coil to effect a final movement of said cam thereby to open the circuit both to said heating element and said drive means and terminate dryer operation completely.

2. In a clothes dryer having heating means and tumbling drive means, an automatic control system comprising a circuit including a heater sequence control switch for said heating means, a second circuit including a sequence control switch for said tumbling drive means, a cam for operating said sequence switches initially closing both switches for a heat drying period and sequentially opening first said heater switch for a cool-down period and subsequently said drive means switch for terminating the dryer operation, thermostatic means cycling between on and off positions in said heating means circuit to maintain a desired average temperature in said dryer during said drying period, a pawl and ratchet wheel device to rotate said cam, a thermostatic element and associated heater for rotating said ratchet wheel in step-by-step fashion during said drying period, a circuit for said thermostat heater energized when said thermostatic means is in said off position and de-energized when said thermostatic means is in said on position, a second heater and thermostat, and a circuit to said second heater including contacts closed by said cam during said cool-down period, said second thermostat and heater functioning to terminate said cool-down period and open the circuit to both said second heater and said drive means.

3. In a clothes dryer having heating means and tumbling drive means, an automatic control system comprising a circuit including a heater sequence control switch for said heating means, a second circuit including a drive means sequence control switch for said tumbling drive means, a cam for operating said sequence switches initially closing both switches for a heat drying period and sequentially opening first said heater switch for a cool-down period and subsequently said drive means switch for terminating the dryer operation, a ratchet wheel for driving said cam, thermostatic means cycling between on and off positions in the heating means circuit to maintain a desired average temperature in said dryer during said drying period, electrically actuated means for engaging said ratchet wheel to advance said cam in a step-by-step fashion during said drying period, a circuit for said electrically actuated means energized when said thermostatic means is in said off position and de-energized when said thermostatic means is in said on position, whereby said electrically actuated means is operated to advance said ratchet wheel and said cam until said heater switch is opened for said cool-down period, a thermostat and a heater for said thermostat, a circuit to said heater including contacts closed by said cam during said cool-down period, and means controlled by said thermostat for effecting a final movement of said cam thereby to open the circuit both to said heater and said drive means and terminate dryer operation completely.

References Cited in the file of this patent

UNITED STATES PATENTS

| | | |
|---|---|---|
| 2,009,601 | Anderson | July 30, 1935 |
| 2,434,347 | Breese | Jan. 13, 1948 |
| 2,436,714 | De Moss | Feb. 24, 1948 |
| 2,467,425 | Cobb | Apr. 19, 1949 |
| 2,505,041 | Gorsuch | Apr. 25, 1950 |
| 2,524,438 | Graves | Oct. 3, 1950 |
| 2,539,185 | Dayton | Jan. 23, 1951 |
| 2,572,162 | Koonz | Oct. 23, 1951 |
| 2,623,699 | Smith | Dec. 30, 1952 |